Dec. 3, 1935. T. E. MURRAY Re. 19,782

HEAT CONDUCTING TUBE

Original Filed June 18, 1924

INVENTOR
THOMAS E. MURRAY, DEC'D
BY THOMAS E. MURRAY, JR.
JOSEPH B. MURRAY, AND
JOHN F. MURRAY, EXECUTORS

BY Ulmer & Rauber
ATTORNEYS

Reissued Dec. 3, 1935 Re. 19,782

UNITED STATES PATENT OFFICE 19,782

HEAT-CONDUCTING TUBE

Thomas E. Murray, deceased, late of Brooklyn, N. Y., by Thomas E. Murray, Jr., Joseph B. Murray, and John F. Murray, executors, Brooklyn, N. Y., assignors to Metropolitan Engineering Company, a corporation of New York Original No. 1,746,272, dated February 11, 1930, Serial No. 720,734, June 18, 1924. Application for reissue January 30, 1932, Serial No. 589,964

4 Claims. (Cl. 257—262)

In certain prior applications, Nos. 642,427, filed May 31, 1923 and 642,725, filed June 1, 1923 (Patent No. 1,746,711, February 11, 1930, Reissue No. 18,748, February 28, 1933), I have described a certain hollow construction for walls and other parts of boilers or heaters and made up of tubes of rectangular, circular or irregular cross-section with fins or flanges extending lengthwise thereof so as to provide a heating surface exposed to the heating gases greater than the surface which is in contact with the water or other fluid in the tube.

The present invention provides a unit from which such boiler walls and the like may be built. The accompanying drawing illustrates embodiments of the invention.

In another application pending concurrently herewith Serial No. 715,369, filed May 23, 1924, (which has since matured into Patent No. 1,844,407 dated February 9, 1932). I have described a certain style of unit for use in the building of such walls or screens. The present application is directed to units of different styles specifically from those described in the said application and in other applications which I have pending.

Figure 1:
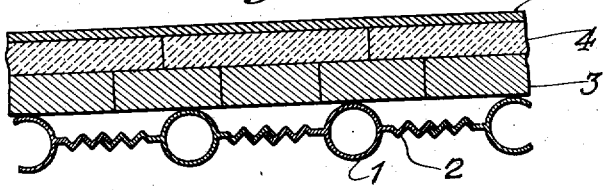
Fig. 1 is a horizontal section of a side wall of a boiler built with the tubular units of the invention.

According to Fig. 1 the boiler wall is provided with a lining or screen comprising tubes 1 with flanges 2 which are of zig-zag shape so as to provide an extended width of surface within a comparatively short space between the tubes; the edges of the flanges from adjacent tubes being overlapped and hooked into engagement with each other so as to hold them close together in spite of distortion under heat. Back of the screen thus formed is an ordinary wall which may, for example, be made of refractory bricks 3 and insulating tiles 4 held by a sheet steel casing 5.

The increased superficial area of the fins or flanges may be secured in various other ways than by bending. For example, in Fig. 2 the developed flange is formed of a common rolled shape 6 which in turn is provided with flanges 7 on its side faces. Thus the developed width of the surface exposed is very much greater than the overall width projected in a straight line. This flange is fastened by butt welding as at 8 to a seamless steel tube. Various other methods may be used for assembling the parts.

Figure 2:
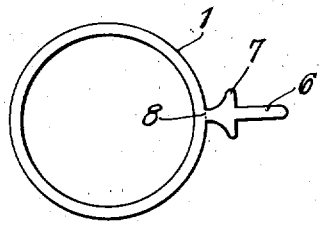
Fig. 2 is a plan of a unit made in accordance with the invention.
Figure 3:
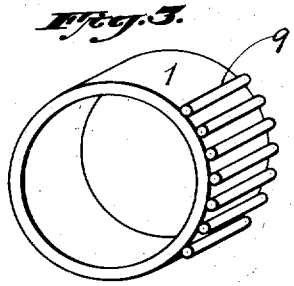
Fig. 3 is a perspective view of another unit.

Instead of getting the extended surface by use of a single flange member as in Fig. 2, it may be obtained by using a number of such members separately fastened to the tube. See Fig. 3. Here the tube has a number of rods 9 extending lengthwise and located at intervals around the outside of a portion of the tube. The same arrangement may be repeated at the opposite portion of the same side of the tube. The rods 9 may be of rectangular or other cross-section, instead of the round shape shown, and of differing dimensions, and they may be united to the tube in various ways.

Figure 4:
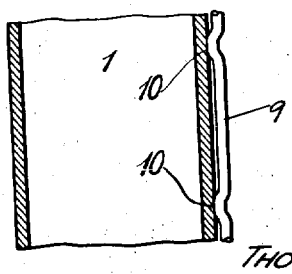
Fig. 4 is a longitudinal section of the same.

According to Fig. 4, I have shown each of the rods 9 welded at intervals in its length, as at 10, to the outside of the seamless tube. The intermediate parts of the rod may be in close contact with the tube, or may be slightly separate therefrom as illustrated.

As described in Murray application No. 715,369, above referred to, the tubes may be of various shapes, and the flanges may be of various compositions or may be specially coated to increase their resistance to oxidation by the flame.

Though I have described with great particularity of detail certain embodiments of my invention, yet it is not to be understood therefrom that the invention is restricted to the particular embodiments disclosed. Various modifications may be made by those skilled in the art without departing from the invention as defined in the following claims.

What I claim is:

1. A heat conducting unit for boilers constituting a separate and complete article of manufacture and comprising a long, small-diameter, thin-walled, steel boiler tube adapted to carry water with a longitudinal flange extending the full length of the tube and adapted for exposure to heating gases, said flange having an exposed side face which is uneven and is of greater developed width than the projected width of the flange itself so as to present an extended surface to the heating gases, the tube having a continuous wall of uniform thickness throughout its circumference and the flange being a separately formed piece welded at one edge to the outer face of the tube and having its other edge free.

2. The heat conducting unit of claim 1, the flange being a strip of sheet metal of uniform thickness and zig-zag cross-section.

3. The combination of a plurality of heat conducting units for boilers separate from but adjacent to each other, each comprising a tubular member adapted to carry water and longitudinal flanges on opposite sides extending the full length of the unit and adapted for exposure to the heating gases, said flanges being welded to the tubular members but unconnected to each other, the flange of one unit having a hook-shaped portion engaging the adjacent edge of the flange of the next unit to hold them together under distortion by heat.

4. A heat conducting unit for boilers or heaters, said unit constituting a separate and complete article of manufacture and comprising a long, small-diameter, thin walled steel tube adapted to carry fluid with a longitudinal flange extending over substantially the entire length of the tube and adapted for exposure to heating gases, said flange having an exposed side face which is uneven and is of greater developed width than the projected width of the flange itself so as to present an extended surface to the heating gases, the tube having a continuous wall and the flange being separately formed and welded at one edge to the outer face of the tube and having its other edge free.

THOMAS E. MURRAY, JR.
JOSEPH B. MURRAY,
JOHN F. MURRAY,
*Executors of the Estate of Thomas E. Murray, Deceased.*